H. MESSMAN.
SIX HORSE DRAFT MECHANISM.
APPLICATION FILED APR. 3, 1909.
957,076.
Patented May 3, 1910.
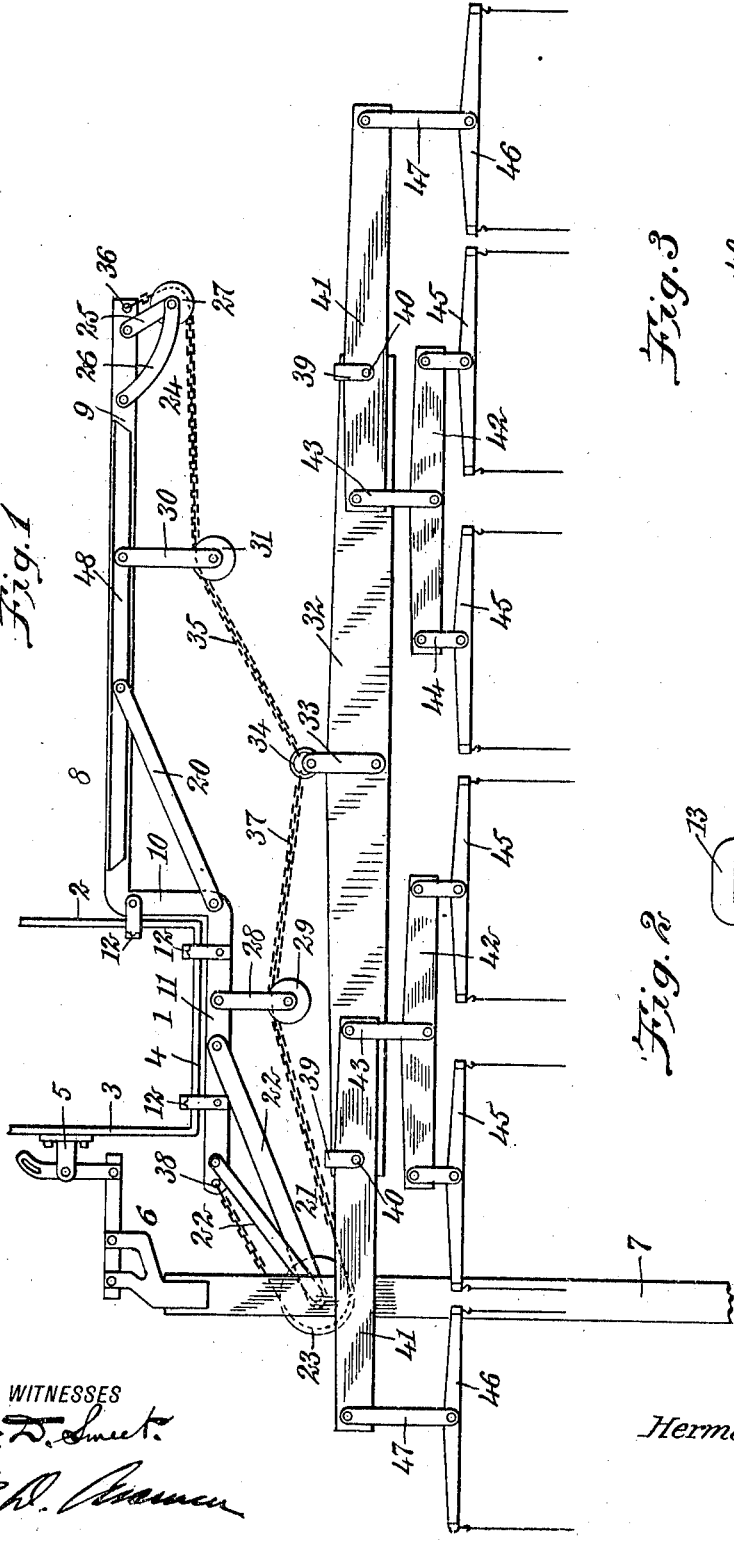
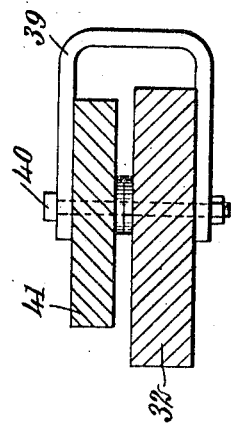
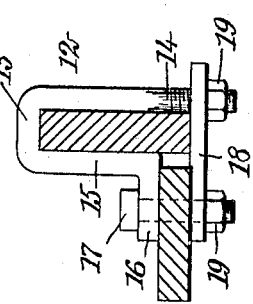
WITNESSES
INVENTOR
Herman Messman
BY
ATTORNEYS

UNITED STATES PATENT OFFICE.

HERMAN MESSMAN, OF KENTLAND, INDIANA.

SIX-HORSE DRAFT MECHANISM.

957,076.  Specification of Letters Patent.  Patented May 3, 1910.

Application filed April 3, 1909. Serial No. 487,628.

*To all whom it may concern:*

Be it known that I, HERMAN MESSMAN, a citizen of the United States, and a resident of Kentland, in the county of Newton and State of Indiana, have invented a new and Improved Six-Horse Draft Mechanism, of which the following is a full, clear, and exact description.

This invention relates to draft mechanism or draft gear enabling a number of horses or similar draft animals to be attached to a plow or other implement, and provides a construction which will equalize the leverage and pulling force exerted by the different animals.

The object of the invention is to provide a draft mechanism adapted to be attached to an ordinary rectangular plow frame, and which will provide for the attachment of six animals which will have an equal leverage.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan of the mechanism and represents the same as attached to the forward end of a rectangular plow frame; Fig. 2 is a vertical section taken through one of the bars of the plow frame, and illustrates the manner in which the draft mechanism is secured thereto, this view being upon an enlarged scale; and Fig. 3 is a vertical section taken through the end of the main tree, and illustrating the manner of attaching the doubletrees thereto, this view being upon an enlarged scale.

Referring more particularly to the parts, 1 represents the forward end of a rectangular plow frame having parallel side bars 2 and 3 connected by a cross bar 4. On the right side of the frame 1, that is, on the outer side of the bar 3, a post 5 is attached, to which post a bracket 6 is attached. The bracket 6 is attached to the rear end of the pole or tongue 7 of the plow which tongue extends forwardly and normally substantially parallel with the side bars 2 and 3 of the frame 1.

I provide a draw bar 8, the body 9 of which extends toward the left from the side of the frame 1 a short distance at the rear of the bar 4, or it may extend toward the right according to whether it is a right-hand or left-hand arrangement. This body 9 is connected by a right-angle extension 10 with a shank 11 which extends across the front of the frame 1, as shown. The draw bar is rigidly attached to the frame 1, by means of clips 12 having the form shown most clearly in Fig. 2. Each clip comprises an inverted U-bolt 13 having a threaded leg 14 which extends below the lower edge of the frame. Each U-bolt seats on the upper edge of the frame, as indicated, and its inner leg 15 is provided with a laterally projecting toe 16 through which a bolt 17 passes. This bolt 17 passes through the draw bar, and to the projecting ends of this bolt and the leg 14, a clip plate 18 is attached by means of nuts 19, as shown. With the arrangement illustrated, it will be evident that the clip plate 18 clamps the draw bar and the frame 1 rigidly together. As shown in Fig. 1, I provide two of these clips 12 which connect the shank 11 to the forward bar of the frame, and a single clip adjacent the rear portion of the extension 10, which connects the shank to the side bar 2 of the frame. The body 9 of the draw bar is connected with the end of the shank 11 by a diagonal brace 20, which materially increases the strength of the draw bar, as will be readily understood.

At the end of the shank 11 which is remote from the body 9, a pulley frame 21 is provided which is formed of inclined strut bars 22 which are attached together at the pivot bolt of the pulley 23. On the outer end of the body 9 a similar, though smaller pulley frame 24 is formed, but this frame is formed of a straight strut bar 25, and a bowed strut bar or bow 26 which is attached to the outer end thereof, and at the pivot of the pulley 27. At an intermediate point on the shank 11, a shackle or link 28 is pivotally attached, and in the forward end of this link, a pulley 29 is mounted. A similar link 30 is attached at an intermediate point along the length of the body 9, and this link is provided with a pulley 31.

Disposed forwardly of the draw bar 8, I provide a main tree 32 which is disposed in a horizontal position, as indicated. This main tree is provided at its middle point with a clevis 33 which projects rearwardly, and is provided with a ring 34. From this ring a chain 35 extends, passing around the rear side of the pulley 31 and around the forward side of the pulley 27, and the end of this chain is anchored at 36 on the end of the body 9. A similar chain 37 is provided, which is attached to the ring 34, and this chain extends around the rear side of the pulley 29 and around the forward side of the pulley 23, the end of the chain being anchored at the point 38 at the end of the shank 11, as indicated. On the ends of the main tree 32, U-brackets 39 are provided, the pivot bolts 40 whereof afford means for attaching tripletrees 41 to the ends of the main tree. These tripletrees 41 have short arms which project inwardly toward the middle of the main tree, and long arms which project outwardly and are twice the length of the short arms. To the short arms of the tripletrees 41, doubletrees 42 are connected by links 43, as indicated. These doubletrees 42 have arms of equal length, and the ends of the arms are connected by links 44 to swingletrees 45. To the outer extremities of the tripletrees 41, swingletrees 46 are connected by links 47, as shown. From this arrangement it will be understood that six horses may be attached to the draft gear, arranged in two sets of three each. The three horses of each set have their pulling force equalized by the tripletrees 41, and exert their collective pulling force upon the ends of the main tree 32. By reason of the chains 35 and 37 which connect the main tree with the draw bar, the pulling force is distributed at points along the length of the draw bar.

Referring especially to Fig. 1, attention is called to the position of the tongue 7 lying as it does just to the left of the horse at the extreme right. In this way the tongue is placed between the pair of horses at the right, and they may be hitched to the tongue in any suitable manner, in this way assisting in keeping the plow straight. In other words, the outer end of the right-hand tripletree projects across the tongue 7. Attention is called also to the manner in which the draw bar 8 is attached to the frame 1, and especially to the fact that it is attached at one of the forward angles of the frame. This fact insures that the beam will be properly braced against longitudinal or lateral displacement with respect to the frame.

In order to stiffen the body 9 of the draw bar, its upper face is provided with a cleat 48 of angle iron or similar material, and through this cleat the brace 20 and the link 30 are attached to the bar.

Having thus described my invention, I claim as new and desire to secure by Letters Patent,—

1. In a draft mechanism of the class described, in combination, a substantially rectangular plow frame, a draw bar having a shank rigidly attached to the forward end of said frame and having a body offset rearwardly from said shank and connected to the same by a right-angle extension, said extension lying against the side of said frame, means for attaching said extension to said frame, a main tree, means for attaching a plurality of draft animals to said main tree, and means for connecting said main tree with said draw bar at a plurality of points.

2. In a draft mechanism of the class described, in combination, a substantially rectangular frame having a forward cross bar and substantially parallel side bars, a pole attached to one of said side bars and extending forwardly therefrom, a draw bar having a body with a shank offset therefrom, means for attaching said draw bar to said frame at a forward corner thereof, a main tree, chains connecting said main tree with said draw bar at a plurality of points, a tripletree carried by said main tree having a long arm projecting across said pole and having a short arm projecting inwardly, a tripletree attached to the other end of said main tree having a long arm projecting outwardly and a short arm projecting inwardly, doubletrees attached respectively to the short arms of said tripletrees, and swingletrees attached to the outer ends of said tripletrees and to the ends of said doubletrees.

In testimony whereof I have signed my name to this specification in the presence of subscribing witnesses.

HERMAN MESSMAN.

Witnesses:
 JAMES T. BURNS,
 FRANK J. BURNS,
 A. E. MORRIS.